United States Patent [19]

Gaffney

[11] 4,417,936
[45] Nov. 29, 1983

[54] PLASTIC WEB WITH MULTIPLICITY OF GAS FILLED BUBBLES, CONTAINING PRINTING THEREON AND METHOD OF MAKING SAME

[75] Inventor: William Gaffney, Bronx, N.Y.

[73] Assignee: Gafcel Industries, Inc., Bronx, N.Y.

[21] Appl. No.: 312,532

[22] Filed: Oct. 19, 1981

[51] Int. Cl.³ .................... B29C 17/00; B32B 31/02
[52] U.S. Cl. ........................ 156/145; 156/244.13; 156/244.16; 156/244.27; 156/285; 156/308.4; 428/166; 428/172
[58] Field of Search ............. 428/166, 172, 178, 179, 428/158; 156/244.13, 244.16, 244.27, 217, 145, 285, 308.4

[56] References Cited

U.S. PATENT DOCUMENTS 2,571,962 10/1951 Smith et al. .................. 156/244.16
3,142,599 7/1964 Chavannos .................... 428/178
4,184,904 1/1980 Gaffney ........................ 156/145

Primary Examiner—Paul J. Thibodeau
Attorney, Agent, or Firm—Kirschstein, Kirschstein, Ottinger & Cobrin

[57] ABSTRACT

A plastic web composes plural laminae mutually defining a multiplicity of gas-filled bubbles, the plastic web being formed so as to include printing on an exterior surface of the web. The printing is included in the plastic web in such a manner as to be an integral part of the web.

Additionally disclosed are methods for manufacturing the above-described plastic web, the methods enabling the production of the plastic web with printing thereon to take place without engendering significant extra expense over and above the expense of creating a similar plastic web which does not include printing as an integral part thereof.

1 Claim, 6 Drawing Figures

PLASTIC WEB WITH MULTIPLICITY OF GAS FILLED BUBBLES, CONTAINING PRINTING THEREON AND METHOD OF MAKING SAME

BACKGROUND OF THE INVENTION

1. Field of the Invention

The present invention relates to a plastic web composed of plural laminae mutually defining a multiplicity of gas-filled bubbles, the web containing printing thereon, and a method of making same.

2. Description of the Prior Art

Already known in the art are plastic webs composed of plural laminae which mutually define a multiplicity of gas-filled bubbles. These webs are commonly used as a protective cushioning to fill voids in packing cartons. They have other uses.

Examples of these types of plastic webs may be found in U.S. Pat. Nos. 3,416,984 and 4,184,904. Essentially these plastic webs constitute a plurality of transparent thermoplastic laminae joined face to face and formed so that the laminae mutually define a multiplicity of pockets which are filled with gas.

It is oftentimes desirable to have the plastic web contain some sort of printing thereon. One of the many numerous uses of such printing is to provide a means of advertising for either the manufacturer of the plastic web or the manufacturer of the article being protectively packed with the plastic web.

Heretofore, it has not been possible to provide a plastic web which contains printing thereon. The gas-filled pockets have prevented the inclusion of such printing, in part because they cause the plastic web to have an irregular contour.

SUMMARY OF THE INVENTION

1. Objects of the Invention

It is an object of the invention to provide a plastic web which is not subject to the drawbacks of prior art plastic webs.

It is another object of the invention to provide a plastic web which has printing thereon.

It is yet another object of this invention to provide a plastic web with printing thereon which is simple to manufacture.

Still another object of this invention is to provide a method of manufacturing a plastic web with printing thereon, in which the printing is affixed to the plastic web during one of the steps normally used to manufacture said plastic web.

It is still a further object of this invention to provide a plastic web with printing thereon which is only minimally more expensive to manufacture than the prior art webs without printing.

Another object of this invention is to provide a plastic web with printing thereon in which the printing is permanently affixed to the web.

It is yet a further object of the invention to provide a plastic web which provides a means for including advertising.

Other objects of the invention in part will be obvious and in part will be pointed out hereinafter.

2. Brief Description of the Invention

In keeping with these objects, and others which will become apparent hereinafter, one feature of this invention resides, briefly stated, in a thermoplastic web which is commonly used as a protective cushioning. The plastic web contains printing thereon. The printing, among other uses, provides a means to include advertising material on the plastic packing web.

Another feature of the present invention resides in a method for producing the thermoplastic web with printing thereon, the method being such that only minimal additional expense is incurred by providing the web with printing.

The plastic web is composed of plural laminae which mutually define a multiplicity of gas-filled bubbles, and there is printing affixed to an exterior surface of the web such that the printing is an integral part of the web.

In a preferred embodiment, the web is a thermoplastic collapsed blown tube. A lamina of thermoplastic material that is compatible with the web and which has printing therein is affixed to one of the laminae defining the gas-filled bubbles.

The afore-described thermoplastic web is preferably manufactured in the following manner: a blown tube is extruded within a certain predetermined temperature range and is passed together with a pre-printed heated thermoplastic lamina between two juxtaposed parallel adjacent cylindrical rollers. The rollers are rotated in opposite directions drawing the extruded tube and the printed lamina into a nip between the rollers while the tube is still at a temperature that permits plastic deformation and fusion. At least one of the rollers has a plurality of recesses on its outer surface. The interior of the tube is filled with gas at a pressure slightly above atmospheric. Means is provided to draw a vacuum in these recesses at the nip and in this way the extruded tube is squeezed into a continuous bilaminar web with raised closed gas-filled pockets. The temperatures of the printed lamina and of the tube are such that the printed thermoplastic lamina autogenously fuses to the extruded tube as they jointly pass through the nip.

In the foregoing manner, the plastic web with printing is formed with the printed lamina forming an outer layer of the web.

An alternative method of manufacturing a plastic web composed of plural laminae which mutually define a multiplicity of gas-filled bubbles having printing affixed to one of its exterior surfaces is another feature of this invention. The alternative method of manufacture is to provide two thermoplastic lamina, one with printing thereon and one without printing, said two laminae being made of mutually compatible materials. The two laminae are heated to temperatures such that they can fuse and seal together. The two laminae are simultaneously passed between two adjacent parallel cylindrical rollers of which at least one has plural recesses with vacuum means. The rollers are rotated in opposite directions so as to draw the laminae into a nip between the rollers to form pockets.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 6:
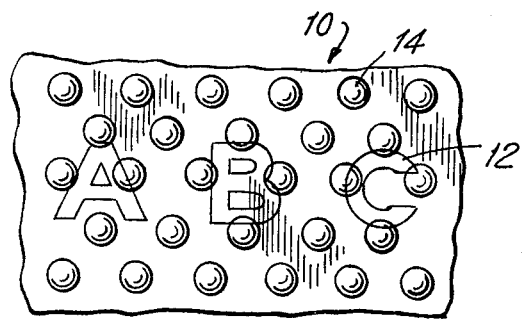
FIG. 6 is an enlarged fragmentary top view of a printed plastic bubble sheet of the present invention.

Referring now in detail to the drawings, and particularly to FIG. 6, the reference numeral 10 denotes a printed plastic web composed of plural thin laminae mutually defining a multiplicity of gas-filled bubbles. The web includes printed material 12. As shown in FIG. 6, the printed material consists of letters but any type of printed material can be used. The printed material is such that it is an integral part of the web 10. The web further contains a plurality of gas-filled bubbles 14. The gas-filled bubbles may be of any shape, size and spacing, and there may be any number of gas-filled bubbles. It only is required that the shape, size, spacing and number of gas-filled bubbles be such that they afford the desired protecting quality or other assigned function, e.g. insulation.

The web 10 is composed of a thermoplastic material. The thermoplastic material is preferably transparent and the printed material is preferably a dark color so as to be clearly visible. All spearate thin thermoplastic lamina used to form the finished web 10 must be of a constitution such that they are mutually compatible and are capable of being sealed, preferably autogeneously, to each other.

Figure 2:
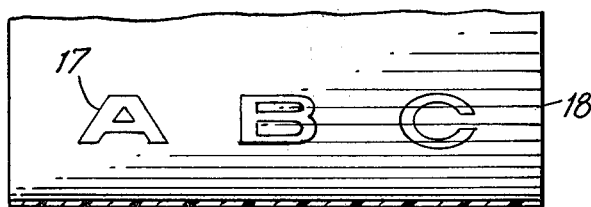
FIG. 2 is a sectional view taken substantially along the line 2—2 of FIG. 1.

In one embodiment of the present invention, as best seen in FIG. 2, the thermoplastic web with gas-filled bubbles and printing thereon 10 is made from (a) a collapsed, blown extruded tube 16, and (b) a lamina 18 of thermoplastic material compatible with the thermoplastic material of the tube and having pre-printing 17 thereon.

In accordance with the present invention, the aforementioned embodiment of the invention is manufactured in the following manner: a lamina of thermoplastic material is imprinted so as to impose printing 17 thereon. Any appropriate method of printing may be used. The printed thermoplastic lamina 18 then is heated and sealed to a blown extruded tube 16 of thermoplastic material. A typical plastic for the tube and lamina is polyethylene.

Figure 1:
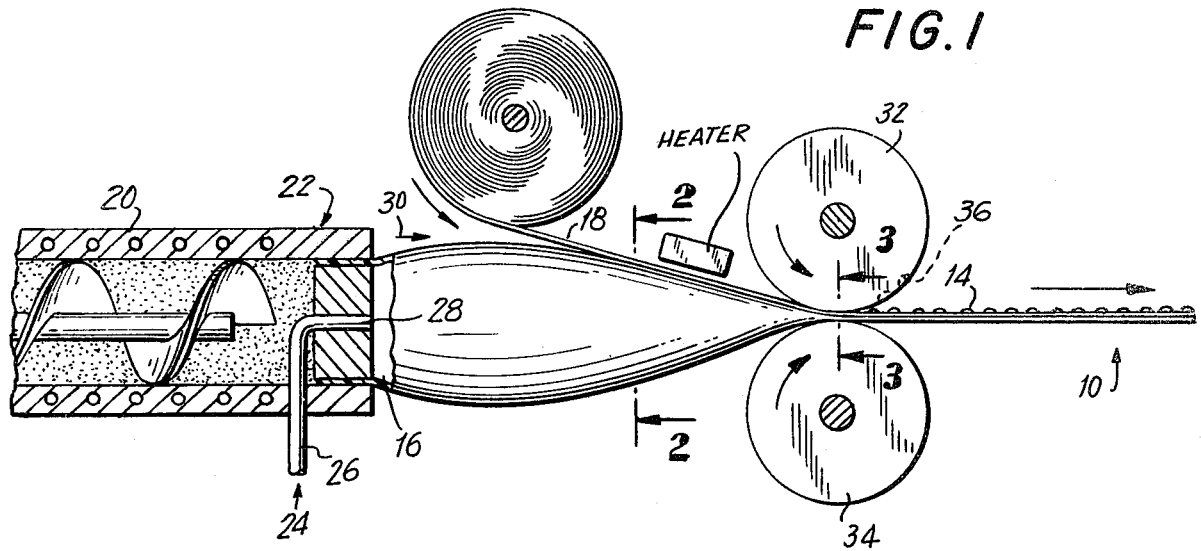
FIG. 1 is a schematic side view of an apparatus for carrying out one embodiment of the method of the present invention.

Blown extruded tube 16 is extruded within a certain predetermined temperature range at which it is molten, said predetermined certain temperature range being a temperature range that will allow the pre-printed lamina 18 to autogenously fuse to the extruded tube 16. As best seen in FIG. 1, a facility 20 provides a hot molten thermoplastic resin to an annular extrusion means 22. A gas stream 24, e.g. air, at a slightly positive pressure of a few inches of water, passes via a pipe 26 to a central discharge outlet 28 aligned with a central axis of the extrusion means 22. A resultant hot tubular hollow pellicular element, the blown extruded tube 16, is extruded from the nozzle 22 and tube 16 moves or travels away from element 22 as indicated by arrow 30. The blown extruded tube 16 may be further heated by a radiant element (not shown). As thus far described, the extrusion of the blown tube is conventional and has been previously disclosed in my U.S. Pat. No. 4,184,904.

In accordance with one of the methods of the present invention, the extruded tube 16 is passed simultaneously with the printed lamina 18 through a nip between a roller 32 and another lower roller 34. The opposed surfaces of the extruded tube 16 are at the same temperature which is such that these surfaces will weld together under the pressure exerted by the rollers. Rollers 32 and 34 are juxtaposed, parallel, adjacent cylindrical rollers. Either roller 32 or roller 34 or alternatively both roller 32 and roller 34 have a plurality of recesses on its outer surface of which recess 36 is exemplificative. The recess 36 as shown in FIG. 1 is a hemispherical cavity, but it may be any appropriately shaped recess.

The rollers 32 and 34 are rotated in opposite directions thereby drawing the extruded tube 16 and the printed lamina 18 into the nip between the rollers.

A means is provided to draw a vacuum in the recesses 36 at the nip. For this purpose each recess 36 is provided with a central passage or a hole (not depicted herein) which extends inwardly a short distance to the hollow interior of the roller containing said recess. A low pressure is created in the interior of the roller within the recess by a vacuum generating means (not depicted), which may be a vacuum pump, aspirator, or the like so that a subatmospheric pressure prevails within the roller. The substmospheric pressure is transmitted through the hole or passage to the recess 36 at the nip between the rollers. Valving or other suitable means (not depicted) are provided so that the substmospheric pressure will not be diminished by being exerted through the passages or holes remote from the nip at any particular time as rollers 32 and 34 rotate.

Suitable means (not depicted), such as a motor, a drive shaft, and gearing are furnished to rotate rollers 32 and 34.

As the blown extruded tube 16 and the printed lamina 18 jointly pass through the nip between rollers 32 and 34, the printed lamina 18 autogenously seals to the extruded tube 16 due to the fact that the extruded tube 16 was extruded within a certain predetermined temperature range sufficiently high to heat the printed lamina 18 to fusion. The specific temperature range is dependent upon the thermoplastic material used.

As the extruded blown tube 16 and fused printed lamina 18 jointly pass through the nip, the extruded tube 16 is squeezed into a continuous bilaminer web with raised, closed gas-filled pockets and the printed lamina 18 is thus formed into the upper layer of the completed web 10.

Figure 4:
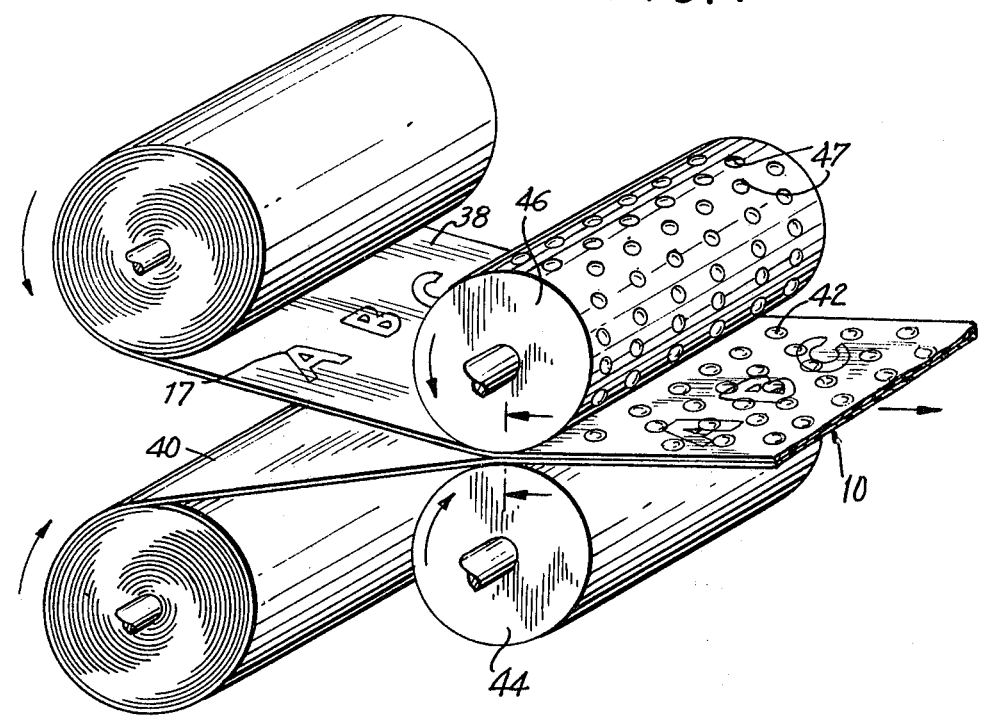
FIG. 4 is a schematic perspective view of an apparatus for carrying out another embodiment of the method of the present invention.

In a second embodiment of the present invention, the thermoplastic web 10 is composed of plural laminae mutually defining a multiplicity of gas-filled bubbles with printing thereon, is comprised of two separate thermoplastic laminae, said separate laminae being of a constitution such as to be mutually compatible and autogenously weldable, thus permitting said laminae to seal to one another. One of said laminae has been pre-printed. The pre-printed lamina 38 of this embodiment of the invention, as best seen in FIG. 4, and the plastic lamina 40 that has not been pre-printed are fused together, so as to form a thermoplastic web with gas-filled bubbles and printing.

Both laminae 38, 40 are thermoplastic and both laminae are transparent. The pre-printed lamina 38 is preferably printed in a dark color which is easily visible.

Thus in this embodiment, the plastic web 10 constitutes two laminae, one of said laminae being printed 38 and the other of said laminae containing no printing thereon.

Either pre-printed lamina 38, non-printed lamina 40, or alternatively both lamina 38 and lamina 40, is formed so as to have pockets therein, pocket 42 being exemplicative of all possible pockets. The pockets may be of any shape and configuration as desired and any number of pockets may be included on the lamina; it is only necessary that the pockets 42 be of a shape and configuration and that a sufficient number of pockets be included so that the finished web 10 is capable of providing protection for packed, breakable merchandise.

This second embodiment of the present invention is manufactured in the following manner: as heretofore stated a first plastic lamina is printed upon so as to form pre-printed lamina 38. A second, non-printed lamina 40 is also provided. Laminae 38 and 40 are of constitutions such that they are mutually compatible and capable of fusing to one another. Either lamina 38 or 40 or both laminae 38 and 40 are provided with the aforedescribed pockets 42.

Laminae 38 and 40 are heated so that they are capable of fusing and sealing together. The heating of the two laminae is conventional in the art and one possible heating method has previously been described in U.S. Pat. No. 3,416,984. There are additionally a number of other heating methods which are usable herein to heat laminae 38 and 40 so that they will fuse and seal together, and any heating method which will so enable the two laminae to seal together can be used in the method of this invention.

The two laminae 38 and 40 are passed between two juxtaposed, adjacent cylindrical rollers 44 and 46. Rollers 44 and 46, as do rollers 32 and 34, have a nip between them.

At the nip between rollers 44 and 46 there is a means for drawing a subatmospheric pressure, said means being identical to the afore-described means for drawing a substmospheric pressure utilized in the method for manufacturing said first embodiment of the present invention.

The pressure reducing means withdraws air from the pocket-forming sockets 47 just prior to the time when laminae 38 and 40 fuse to one another.

Laminae 38 and 40, which as heretofore mentioned have been pre-heated, are simultaneously drawn between rollers 44 and 46 which are rotating on opposite directions. Laminae 38 and 40 are drawn into the nip between the rollers. As heretofore mentioned air is withdrawn from these sockets 47 at the nip, and as in the method for manufacturing the first embodiment of this invention, valving or other suitable means (not depicted) is provided so that the pressure reducing effect will not be diminished by being exerted through sockets 47 remote from the nip as rollers 44 and 46 rotate.

Immediately after the air pressure in sockets 47 is reduced, laminae 38 and 40, due to the aforementioned pre-heating, seal to one another.

In this manner, a thermoplastic web composed of two laminae mutually defining a multiplicity of gas filled bubbles and with printing as an integral part thereof is produced.

Figure 3:
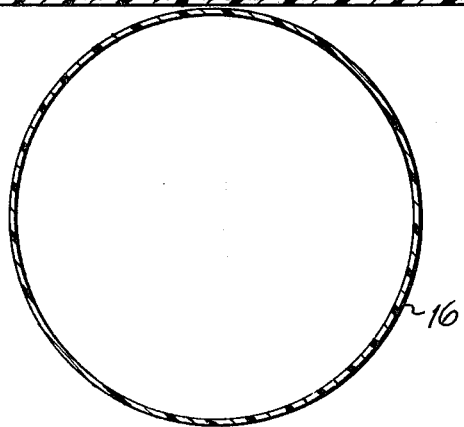
FIG. 3 is an enlarged sectional view taken substantially along the line 3—3 of FIG. 1.
Figure 3:
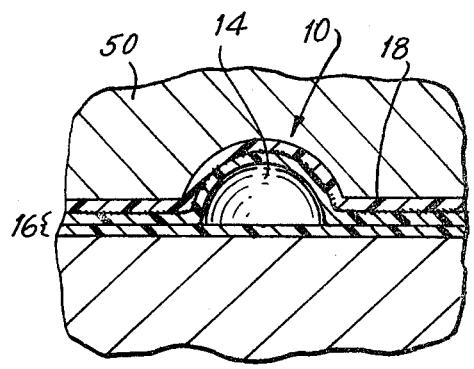

As best seen in FIG. 3, the first of the preferred embodiments of this invention is a plastic web 10, comprised of an upper integral layer 50 with printing 17 thereon, and a lower bilaminar layer which has been formed from the extruded tube 16. Contained within layers 50 and 16, and defined by them, are a plurality of gas filled bubbles 14.

Figure 5:
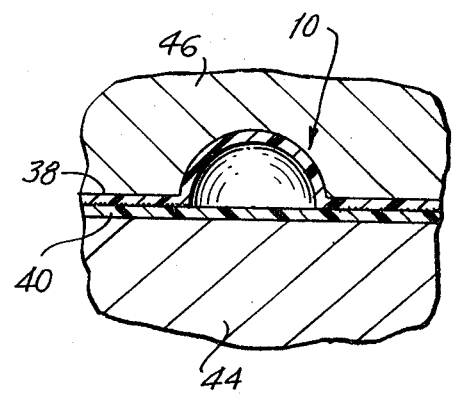
FIG. 5 is an enlarged sectional view taken substantially along the line 5—5 of FIG. 4.

As best seen in FIG. 5, in the second embodiment of this invention, the plastic web 10 is comprised of a first thermoplastic lamina 38 with printing thereon, and a second thermoplastic lamina without printing 40, laminae 38 and 40 being sealed together and containing and defining a plurality of gas filled pockets or bubbles 16.

It will be understood that each of the elements described above, or two or more together, may also find a useful application in other types of constructions differing from the types described above.

While the invention has been illustrated and described as embodied in a plastic web with a multiplicity of gas filled bubbles, the web containing printing thereon and method of making same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of making a thermoplastic web composed of plural thermoplastic laminae mutually defining a multiplicity of gas-filled bubbles, and means providing printing on the exterior surface of the web such that it is an integral part of the web, said web constituting a collapsed blown extruded tube, there being a lamina of thermoplastic material compatible with that of the tube and having printing thereon, said lamina being fused to the external surface of one of the laminae defining the gas-filled bubbles, said method comprising the steps of:
   (A) extruding the blown tube within a certain temperature range;
   (B) printing on and heating the thermoplastic lamina;
   (C) simultaneously passing the extruded tube and the printed lamina between two juxtaposed parallel adjacent cylindrical rollers;
   (D) rotating said rollers in opposite directions to draw said extruded tube and said printed heated lamina into a nip between the rollers, at least one of said rollers having a plurality of recesses on its outer surface;
   (E) maintaining a subatmospheric pressure in the recesses at the nip whereby said extruded tube is squeezed into a collapsed extruded tube forming a continuous bilaminar web with raised closed gas-filled pockets; and
   (F) said certain temperature range being such that the printed heated lamina will autogenously fuse to the collapsed extruded tube as they jointly pass through the nip,
   (G) whereby, the printed lamina forms an upper layer of the web.

* * * * *